United States Patent [11] 3,571,627

[72] Inventors Carlos D. Cardon
Georgetown;
Don S. Williams, Andover, Mass.
[21] Appl. No. 748,348
[22] Filed July 29, 1968
[45] Patented Mar. 23, 1971
[73] Assignee Bell Telephone Laboratories Incorporated
Murray Hill, Berkley Heights, N.J.

[54] REGULATED HARMONIC GENERATOR
5 Claims, 3 Drawing Figs.

[52] U.S. Cl. ........ 307/271,
307/264, 307/265, 307/273, 328/16, 328/167, 328/175, 331/109
[51] Int. Cl. ........ H03k 1/18
[50] Field of Search ........ 307/265, 264, 271, 273, 279, 304; 328/16, 58, 167, 175, 207, 209, 170, 263; 332/9 (T), 9; 330/96; 331/183, 8, 15, 76, 109

[56] References Cited

UNITED STATES PATENTS

| | | | |
|---|---|---|---|
| 3,249,895 | 5/1966 | Corney | 332/9(T) |
| 3,257,631 | 6/1966 | Evans | 307/304X |
| 3,281,699 | 10/1966 | Harwood | 331/109X |
| 3,421,114 | 1/1969 | Eddy et al. | 332/9 |
| 3,436,682 | 4/1969 | Birnbaum | 332/9 |
| 3,469,116 | 9/1969 | Nomura | 307/273 |

*Primary Examiner*—Stanley T. Krawczewicz
*Attorneys*—R. J. Guenther and E. W. Adams, Jr.

ABSTRACT: A harmonic generator employing an emitter-coupled monostable multivibrator with a feedback loop including a field effect transistor responsive to variations in the amplitude of a selected harmonic output signal to vary the input bias to the multivibrator. Varying the input bias to an emitter-coupled monostable multivibrator modifies the duty cycle of its rectangular output waveform and thereby regulates the amplitude of the selected harmonic in response to variations in the output signal.

INVENTORS C. D. CARDON
D. S. WILLIAMS
BY John P. McDonnell
ATTORNEY

REGULATED HARMONIC GENERATOR

BACKGROUND OF THE INVENTION

This invention relates to signal generators and more particularly to harmonic generators with amplitude control.

In many electrical systems, a single, very accurate frequency is generated to serve the frequency standard for the entire system. From this standard frequency, other frequencies, which are usually harmonics of the standard frequency are obtained. To obtain a desired frequency of a value other than a harmonic, the harmonics are either added or subtracted. Such a system has the disadvantage that the slightest variations in the standard frequency or waveform cause significant variations in the harmonics, especially in the higher order harmonics as, for example, the $50^{th}$ harmonic.

In the past, attempts were made to minimize these variations by using a standard frequency source with a relatively high amplitude sinusoidal output. Zener diode networks were then used to clip the sinusoid at relatively low amplitude points, i.e., points near the time axis, to obtain a waveform that was substantially square. The desired harmonics were then filtered from this square wave. This signal generating process is relatively expensive and fails to obtain amplitude regulation of a degree comparable to that obtained with closed loop techniques.

It is therefore an object of this invention to obtain harmonic amplitude regulation using closed loop feedback techniques.

SUMMARY OF THE INVENTION

The amplitude of each of the harmonics in a rectangular wave varies with the duty cycle of the rectangular wave. In the present invention, a rectangular wave generator, which in a preferred embodiment will be an emitter-coupled monostable multivibrator, is employed as the signal generating source. A filter network is connected to the rectangular wave output of the multivibrator to select a desired harmonic. A feedback network comprising a field effect transistor is connected in a closed loop between the selected harmonic output of the filter and the input to the rectangular wave generator to be responsive to amplitude variations of the selected harmonic and vary the input bias to the rectangular wave generator accordingly. Varying the input bias to the rectangular wave generator causes the duty cycle of the output waveform to be modified so as to compensate for the amplitude variations of the selected harmonic.

BRIEF DESCRIPTION OF THE DRAWINGS

Other objects and features of the present invention will readily be apparent from the following discussion and drawings in which.

DETAILED DESCRIPTION

Figure 1:
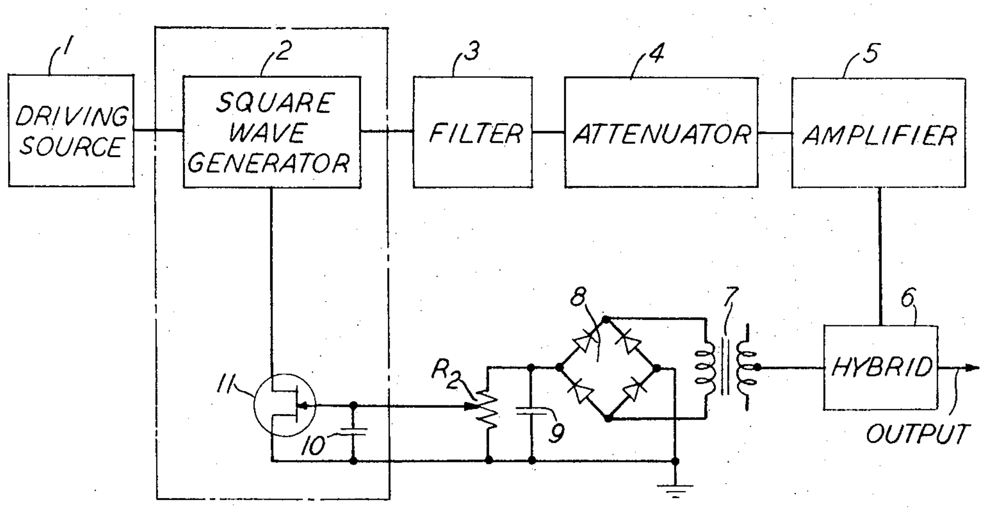
FIG. 1 shows a schematic-block diagram of the invention.

As can be seen from FIG. 1 of the drawing, a driving source 1, which may have any suitable wave shape, is connected to drive the rectangular wave generator 2. Filter 3, which is designed to pass a desired harmonic of the rectangular wave output of the rectangular wave generator 2, is connected to the output of this rectangular wave generator. The selected harmonic is then fed to attenuator 4 to provide a method of checking the transient response and regulation of the circuit and impedance matching between the filter 3 and the amplifier 5. The signal from the attenuator is amplified by amplifier 5 and then passed to a hybrid 6, which may be a coil, to separate a small portion of the signal, to be used as feedback, from the output signal. The portion of the signal selected is then fed to step-up isolation transformer 7 which has a full wave rectifier 8 connected across its secondary winding. Stepping up the portion of the output signal selected as feedback provides a wide range of feedback control, as discussed hereinafter. The output of the full wave rectifier 8 is filtered by capacitor 9. Potentiometer R2 is connected across the filter capacitor 9 to select a predetermined portion of the voltage across potentiometer R2 as the bias for field effect transistor 11. As discussed in detail hereinafter, the setting of potentiometer R2 is determined so as to bias the harmonic generator at a point of negative feedback on the amplitude-duty cycle plot. Capacitor 10 is connected across the gate and drain electrodes of field effect transistor 11 to guard against the possibility of oscillation in the feedback loop. The source electrode of field effect transistor 11 is connected to the rectangular wave generator 2.

Before discussing the operation of the circuit of FIG. 1 in detail, it appears useful to briefly discuss the characteristics of a rectangular wave. It is well known that a rectangular wave is comprised of certain harmonics. In a rectangular pulse train of amplitude $A$, period $T$, and pulse width $t_o$, the coefficient of the $N^{th}$ harmonic is expressed by the equation $$C_N = 2A\frac{t_o}{T}\left|\frac{\sin N\pi\frac{t_o}{T}}{N\pi\frac{t_o}{T}}\right| \qquad (1)$$

where the ratio of $t_o/T$ represents the duty cycle $D_c$. For a particular harmonic $N=K$ where the duty cycle $D_c$ replaces $t_o/T$ the equation becomes $$C_K = \frac{2A}{K\pi}|\sin K\pi D_c| \qquad (2)$$

Figure 2:
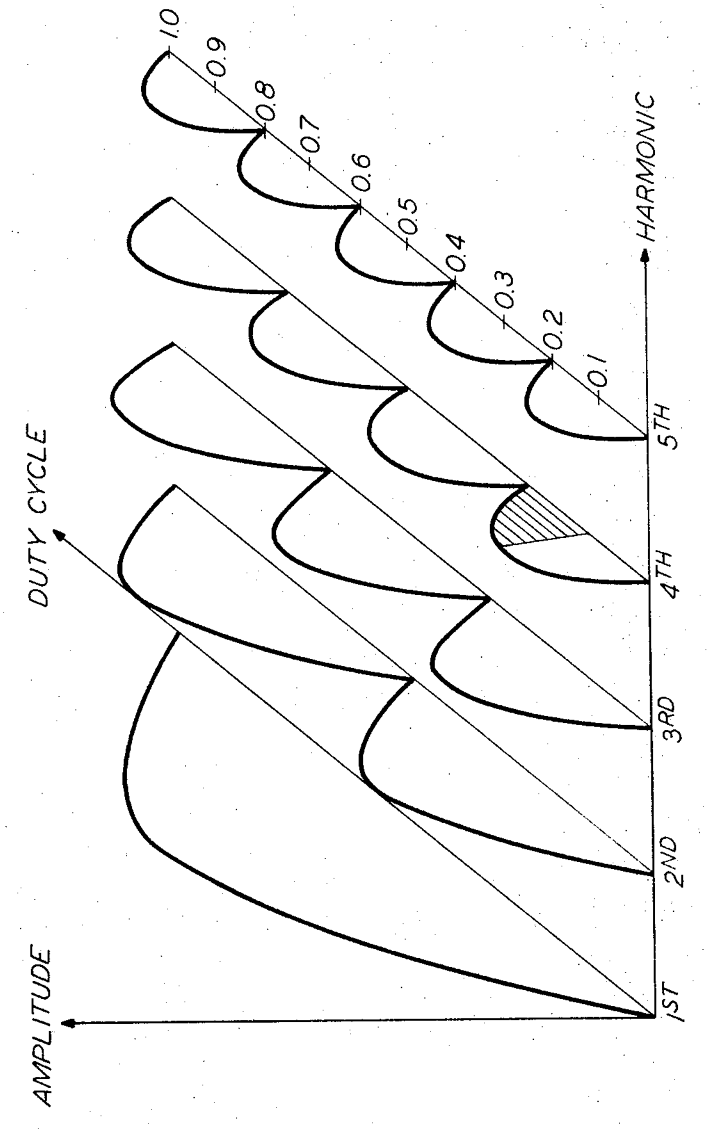
FIG. 2 illustrates the relationship between harmonic amplitude and the duty cycle of its fundamental rectangular wave.

Equation (2) shows that the amplitude of the $K^{th}$ harmonic is a full wave, rectified sine function of the duty cycle. From this equation, it can be seen that (1) the amplitude of the coefficient of a selected harmonic varies from 0 to $2A/K\pi$ and is a function of the duty cycle; and (2) that the coefficient is 0 when the duty cycle is 0 or 1 and the function is symmetrical around a duty cycle of $D_c=0.5$. By controlling the duty cycle of rectangular pulse generator in response to a feedback signal proportional to the amplitude of a selected harmonic, one may therefore obtain amplitude regulation of the selected harmonic. The relationship between amplitude, duty cycle, and the first five harmonics of a square or rectangular wave is shown in three-dimensional rectangular coordinate form in FIG. 2. In FIG. 2, the $x$ axis represents the harmonic, the $y$ axis the amplitude of the harmonic, and the $z$ axis the duty cycle. The relationship between the amplitude of the harmonic and the duty cycle is believed to be readily apparent from FIG. 2.

Before discussing the network in which this principle is implemented in the novel structure of FIG. 1, it is useful to discuss the characteristics of a field effect transistor such as transistor 11. Over the range which the field effect transistor 11 is designed to operate in the present invention, the current through the drain and source electrodes will vary linearly with the voltage across the gate and source electrodes. The field effect transistor thus acts as a resistor whose resistance varies linearly with the bias applied to the element.

In the circuit of FIG. 1, the driving source 1 drives the rectangular wave generator 2 at a predetermined frequency. The rectangular wave output of the generator 2 is fed to filter 3 which passes only a desired harmonic. The selected harmonic is then attenuated and amplified with a portion of the selected harmonic channeled from the output to serve as a feedback signal. The portion selected as the feedback signal is rectified by full wave rectifier 8 and filtered by capacitor 9 to provide a DC bias for the field effect transistor 11. For reasons discussed in detail in connection with FIG. 3, a portion of this bias is selected by potentiometer R2 and applied to the gate and drain electrodes of field effect transistor 11. This bias linearly varies the current flow through the source and drain electrodes of transistor 11 to control the bias level of the rectangular wave generator 2. Controlling the bias level of the rectangular wave generator 2 in turn causes the duty cycle of its rectangular wave output to vary thereby regulating the amplitude of the harmonics comprising the rectangular wave as discussed heretofore. Amplitude regulation of the selected harmonic is thus obtained by closed loop techniques. It should be noted that any equivalent network, such as a controlled resistive network, which is linearly responsive to a signal such as the present feedback signal could be substituted for the field effect transistor 11.

Figure 3:
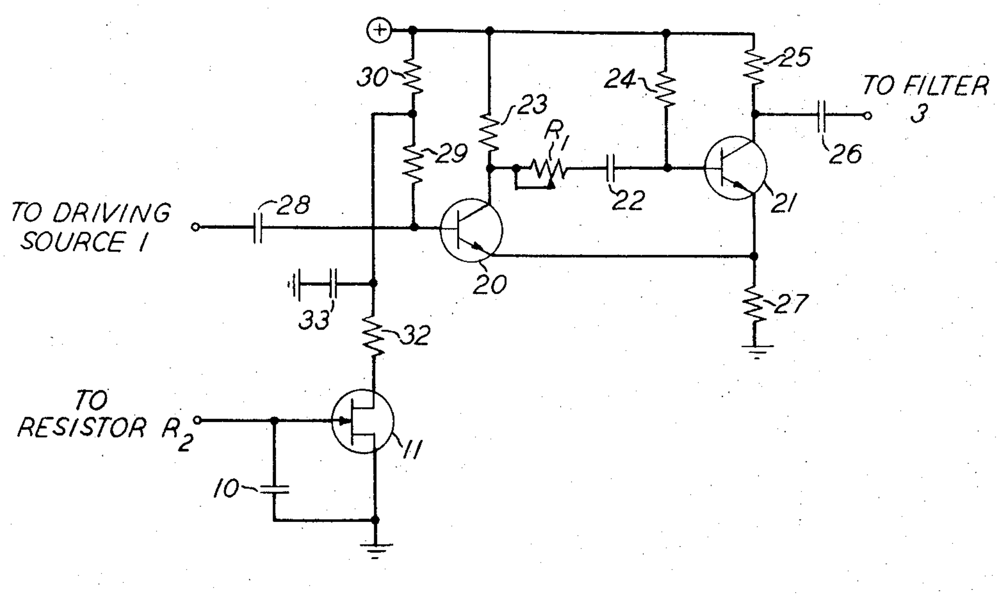
FIG. 3 illustrates the combination of an emitter-coupled monostable multivibrator and field effect transistor which might be used in the dotted box of FIG. 1 in a preferred embodiment of the invention.

The circuitry which may be employed in the dotted box of FIG. 1 in a preferred embodiment of the invention is shown in FIG. 3 with the field effect transistor 11. In FIG. 3, transistors 20 and 21 are connected in an emitter-coupled monostable multivibrator configuration. In this monostable multivibrator, resistor R1 and capacitor 22 are serially connected from the collector of transistor 20 to the base of transistor 21. Resistor 23 is connected from the collector electrode of transistor 20 to the source of positive potential, while resistor 24 is connected from the base electrode of transistor 21 to the source of positive potential. Resistor 25 connects the collector electrode of transistor 21 to the source of positive potential and resistors 29 and 30 are serially connected between the base electrode of transistor 20 and the source of positive potential. Capacitor 26 couples the output signal at the collector electrode of transistor 21 to filter 31. Resistor 27 connects the emitter electrode of transistors 20 and 21 to ground. Capacitor 28 couples the signals from the driving source 1 to the base electrode of transistor 20. The operation of the emitter-coupled monostable multivibrator is believed to be sufficiently well known in the art to forego further discussion at this time.

Field effect transistor 11 is connected to the input biasing circuit of transistor 20 to vary the bias at the base electrode of this transistor and thereby control the duty cycle of the rectangular output wave of the multivibrator as discussed heretofore. The source electrode of field effect transistor 11 is connected to the junction of resistors 29 and 30 by resistor 32. Capacitor 33 is connected from the junction of resistors 20 and 30 to ground to provide a high frequency (with respect to the frequency of the selected harmonic) AC ground at the input to the multivibrator and thereby present a relatively constant impedance to the driving source 1. The drain electrode of field effect transistor 11 is connected to ground, and capacitor 10 is connected across the gate and drain electrodes of this transistor to guard against the possibility of oscillation in the feedback loop.

As discussed heretofore, varying the gate-drain voltage across field effect transistor 11 causes the source-drain current to vary in a linear proportion. Changing the source-drain current causes the potential at the junction of resistors 29 and 30 to vary, thereby varying the potential at the base of transistor 20. The change of potential at the base of transistor 20 causes the collector current through transistor 20 to change and thereby modify the charge on capacitor 22 and the duration of the interval that transistor 21 is conducting. The duty cycle of the output waveform is thus controlled in accordance with the source-drain current through field effect transistor 11 which is in turn controlled by the amplitude of the selected harmonic. Amplitude regulation is therefore obtained with relatively little sacrifice of the signal power, no additional power drain, and at a relatively small cost. It should also be noted that vernier amplitude control and precise amplitude setting of a given harmonic may be used by using a higher harmonic as the feedback signal.

For purposes of illustration only, assume that the feedback network of the present invention is arranged such that a positive deviation in signal output causes an increase in pulse width (duty cycle). With this illustration, it can be seen from the first half-sinusoid of the fourth harmonic in FIG. 2 (also chosen for illustrative purposes only) that the unshaded region is an unstable positive feedback region while the shaded region is the section of potentially stable negative feedback. In order to put this feedback into operation, it is thus necessary to insure that the circuit is biased at a point of negative feedback on the amplitude-duty cycle plot. This is done in the circuit of FIG. 3 by setting potentiometer R2, the feedback control, to zero and adjusting variable resistor R1, the duty cycle control, to a proper point. Feedback is then slowly introduced by advancing R2 while slightly adjusting R1 to maintain a desired operating point. This method of adjusting the operating point has been found to yield satisfactory regulation of selected harmonics.

The above-described arrangement is illustrative of the application of the principles of the invention. Other embodiments may be devised by those skilled in the art without departing from the spirit and scope thereof.

We claim:

1. A signal source comprising a rectangular pulse generator whose duty cycle varies with applied bias voltage, a single harmonic filter network connected to the output of said pulse generator to select a single desired harmonic from the rectangular wave output of said pulse generator, and feedback means connected from the output of said filter to said rectangular pulse generator, said feedback means being responsive to the amplitude of said desired single harmonic to vary the bias voltage applied to said rectangular pulse generator and thereby vary the duty cycle of said pulse generator rectangular wave, whereby the amplitude of the selected single harmonic is varied in accordance with amplitude variations of the selected harmonic.

2. A signal source in accordance with claim 1 wherein said rectangular pulse generator comprises an emitter-coupled monostable multivibrator and a source of input frequency is connected to said multivibrator to drive said multivibrator at a predetermined frequency.

3. A signal source in accordance with claim 2 wherein said feedback means includes a linear resistor connected to the input of said emitter-coupled monostable multivibrator and the output of said filter, the resistance of said linear resistor being varied in response to variations in the amplitude of said single selected harmonic.

4. A signal source in accordance with claim 2 wherein said feedback means comprises a field effect transistor having its gate and drain electrodes connected to be responsive to said selected single harmonic output from said filter and its source electrode connected to the input of said emitter-coupled monostable multivibrator.

5. A signal source comprising a source of input frequency, an emitter-coupled monostable multivibrator having first and second transistors, means connecting the collector electrode of said first transistor to one terminal of a source of bias potential, means connecting the base and collector electrode of said second transistor to said one terminal of said source of bias potential, means connecting the emitter se electrodes of said first and second transistors to another terminal of said source of bias potential, a variable resistor and a capacitor serially connected from the collector electrode of said first transistor to the base electrode of said second transistor, means connecting the base electrode of said first transistor to said source of input frequency, a field effect transistor having gate, drain, and source electrodes, means connecting the drain electrode of said field effect transistor to said other terminal of said source of bias potential, means connecting the source electrode of said field effect transistor to the said one terminal of said source of bias potential and the base electrode of said first transistor, a single harmonic filter connected to the collector electrode of said second transistor to select a predetermined single harmonic from the rectangular wave output of said multivibrator, a potentiometer having its end terminals coupled to be responsive to at least a portion of the selected single harmonic appearing at the output of said filter, and means connecting the wiper arm of said potentiometer to the gate electrode of said field effect transistor, whereby said variable resistor may be adjusted in conjunction with said potentiometer to obtain a negative feedback operating point.